United States Patent [19]

Menting

[11] 4,317,763

[45] Mar. 2, 1982

[54] CATALYSTS AND BINDER SYSTEMS FOR MANUFACTURING SAND SHAPES

[75] Inventor: James E. Menting, Algonquin, Ill.

[73] Assignee: The Quaker Oats Company, Chicago, Ill.

[21] Appl. No.: 132,894

[22] Filed: Mar. 24, 1980

[51] Int. Cl.$^3$ .............................................. C08L 61/06
[52] U.S. Cl. .................................. 523/144; 524/593; 524/594
[58] Field of Search .............. 260/DIG. 40, 38, 42.43; 528/143

[56] References Cited

U.S. PATENT DOCUMENTS

| | | | |
|---|---|---|---|
| 3,734,936 | 5/1973 | Brown et al. | 260/DIG. 40 |
| 3,745,139 | 7/1973 | Kachur et al. | 260/DIG. 40 |
| 3,793,286 | 2/1974 | Petersen et al. | 260/DIG. 40 |
| 4,028,271 | 6/1977 | Schaidle et al. | 260/38 |
| 4,119,606 | 10/1978 | Teplyakov et al. | 260/38 |
| 4,143,867 | 3/1979 | Hoppe et al. | 260/38 |

Primary Examiner—Lewis T. Jacobs
Attorney, Agent, or Firm—James T. FitzGibbon

[57] ABSTRACT

A catalyst material particularly useful in making core sand from which resin bound sand shapes are made. The preferred catalyst is a material comprising at least one salt made from a weak base and an acid from the group comprising lower aliphatic and aromatic sulfonic acids. The curable resin binder is preferably a furfuryl alcohol polymer or other furan-based material. The resin is preferably present in an amount of about 0.5% to about 5% based on the weight of sand, while the catalyst is present in an amount of about 5% to 40% by weight of the resin material. The catalyzed composition provides an excellent combination of working or bench life, rapid curing on a delayed action basis and favorable shape-imparting and holding properties in the formed sand shapes. Specifically preferred compositions include aluminum and copper phenol and toluene sulfonic acid salts.

17 Claims, No Drawings

CATALYSTS AND BINDER SYSTEMS FOR MANUFACTURING SAND SHAPES

The present invention relates to chemical compositions and methods useful in metal founding, and more particularly, to specialty catalysts which are useful in curing so-called "hot box" resin-type binders for core sand and the like used in metal foundries.

The expression "core sand" is sometimes used herein to include sand used in making shapes of all sorts for foundry purposes, including sand shapes which are to be used as mold cores, sand shapes useful in other casting processes, including sand shapes which are made in patterns and cured therein as well as free standing sand shapes which may be cured in conventional ovens or in microwave ovens for any desirable purpose in foundry work.

In typical foundry practice, core sands of various kinds are formed into sand shapes and set by various methods. Generally speaking, binders for core sand may be subdivided into the so-called "hot box" type of binder and the so-called "no-bake" type of binder. The hot box type binders are generally preferred for certain applications because they are inexpensive, because they produce generally satisfactory results, and because they are well suited to high volume production, particularly production of ordinary iron castings. A typical hot box binder utilizes furan based resins, phenol-formaldehyde resins, often mixed or modified with urea-formaldehyde binders. While cast iron is tolerant of gaseous nitrogen released when the hot metal is poured over a core containing a urea-formaldehyde-containing (UF) binder, certain other metals and alloys are not desirably used with binders of this sort. Accordingly, the low cost potential of phenol-formaldehyde binders modified with UF resins cannot be realized in many applications.

Referring now to certain hot box type binders, while these binders are desirable in many respects, there are recognized drawbacks with these binder systems, and their catalysts, particularly catalyzed binders of the furan type. By "furan type" or "furan-based" binders as used herein is meant those binders which contain derivatives of furan, particularly including furfuryl alcohol, whether used alone or with phenolic resins, UF resins, or mixtures thereof.

In present foundry practice, it is customary to form a core for a casting by filling a heated pattern cavity with a core forming material which comprises core sand mixed with a resin and a catalyst. Desirably, when the core sand material is mixed and placed in the mold, the high temperatures cause rapid curing of the resin, which binds the core sand, making a core which is capable of easy removal from the pattern, which has high strength so as to withstand rough handling, and which is stable so as to permit storage over a long period of time. Moreover, an ideal binder is one which permits the sand to retain so-called high flowability or ease of pattern filling when the sand and the binder are mixed.

In a desirable catalyst and resin system, the resin will not set prematurely, even in the presence of a catalyst, at a given working temperature, but the resin will cure rapidly and completely when a desired threshold temperature is reached or exceeded.

While prior art catalyst and binder systems have functioned satisfactorily in many respects, as the cost of labor and the cost of maintaining production facilities have increased, it has become economically important to mix core sand with binders in larger quantities to increase production and reduce costs. In this respect, prior art curing systems providing relatively short bench lives have either required repetitious work efforts on behalf of the foundry workers mixing the material, or have resulted in waste of chemicals resulting from the need to discard material which was setting up prematurely, i.e., before it could be placed in molds or patterns in which the sand core elements are formed. By "bench life", it is meant the time during which the catalyst may remain mixed with the resin before a substantial portion of the polymerization reactions begins to take place.

To illustrate prior art practices, even though known core binder adhesive systems using known catalysts will commonly have bench lives of from one to four hours, it is preferable that such binders have bench lives equal to at least the length of one working shift, and preferably an hour or more longer than that, i.e., bench lives of eight to twelve, or even twenty-four hours.

Accordingly, an ideal catalyst, even though having a protracted bench life, would have a relatively rapid setting time, and would promote thorough curing of the resin throughout the entire sand mix.

Still further, a desirable resin and catalyst system should preferably create low gas evolution when subject to heat, and should impart high tensile strength to the finished core or other sand product made therefrom and used in molding processes.

According to the invention, it has been found that particular compounds, including certain aliphatic or aromatic sulfonic acid salts are surprisingly able to provide highly advantageous resin curing systems, and can therefore be used with great success as catalysts for furan-derived resins used as core sand binder materials.

According to the invention, some or all of the catalysts of the type with which the invention is concerned may be mixed with the resin material and sand at room temperature, but will not activate or measurably catalyze the curing reaction for a relatively extended period of time at the working temperatures in question. In foundry practice, such temperatures may range from 50° to 60° F. in the winter to 90° F. or more during the summer. In any case, the temperature of the core sand before application of binder thereto is, in actual practice, generally uncontrolled. However, when the core sand is heated to the temperature at which the core is formed in the mold or pattern, the resin cures rapidly to produce a tough mold core. Inasmuch as such catalysts do not measurably initiate or accelerate the curing reaction at lower temperatures, but do so rapidly at the higher temperatures in question, these catalysts are generally referred to as "latent catalysts".

In keeping with the invention, catalyst performance will be evaluated in terms of the length of time during which the catalyst can remain in association with the resin and the sand without setting up, and this property will be compared with the speed with which substantial curing takes place and with the ultimate tensile strength of the sand shape or core product made by binding the sand with the resin binder.

With prior art resin systems, long bench life of known materials was associated with excessively long cure time at elevated temperatures. Accordingly, it was not generally believed possible to obtain long bench life and quick curing with the same catalysts and catalyzed resin systems. According to the present invention, a greatly extended bench life is provided without sacrificing favorable curing time characteristics and ultimate tensile or yield strength in the finished core sand product.

Certain catalysts with which the invention are concerned are not only able to provide increased bench life, but, quite surprisingly, display activation temperatures which are quite low in relation to the activation temperatures of prior art latent catalysts. More specifically, catalysts of the invention have proven effective to make satisfactory mold cores within a short time at a temperature of 300° F., while most prior art catalysts of the hot box type required initial temperatures of about 425°, for example. Accordingly, certain catalysts of the invention may be said to make possible the concept of an intermediate temperature or "warm box" binder system, while these same catalysts are also useful in conventional hot box applications and processes.

In the prior art, certain ammonium salt type catalysts have been known to be used in curing furan binder systems, including binder systems modified by the addition of furfuraldehyde or furfuryl alcohol. However, such catalysts, including ammonium chloride and ammonium nitrate, for example, were known to have various drawbacks, including relatively short bench life in relation to that which is commercially acceptable in modern foundry practice.

It has generally been considered that for these types of catalysts to be effective, the resin binder must contain at least some free formaldehyde in order to activate the catalyst. This requires that the catalyst solution also contain some urea to keep the formaldehyde released to the environment at a tolerable level.

In view of the shortcomings of the prior art and the need for improved resin binder systems and catalysts for use in such systems, it is an object of the present invention to provide an improved resin binder and catalyst system for use with core sands.

A further object is to provide a latent catalyst for use with furan-based binders which will enable the user to save labor by mixing larger quantities of the catalyzed resin and/or resin-treated core sand in a single batch.

Another object is to provide a latent catalyst system which offers better curing characteristics without sacrifice of strength in relation to prior art curing systems.

Yet another object is to provide a method of curing a resin system and of making sand cores for use in foundry applications.

A still further object is to provide a catalyst and catalyzed resin system which will cure in as little as ten to thirty seconds or less in use, but which will provide a bench life of from eight hours up to twenty-four hours, and in some cases, as much as forty-eight hours.

Another object is to provide a catalyst which is safe and reliable in use, and which is free from serious drawbacks affecting storage and use, and which does not require unusual handling or mixing.

Yet another object is to provide a resin curing system which includes the use of specialty latent catalysts such as various salts of aromatic and aliphatic sulfonic acid, including phenol and toluene sulfonic acid salts, to provide extended bench life at low temperatures, and a rapid cure rate at elevated temperatures, without major drawbacks in use.

A still further object is to provide a catalyst system which is operable at temperatures, and within temperature ranges, which were not previously considered operable temperatures or temperature ranges within which prior art catalysts would perform satisfactorily.

Still another object of the invention is to provide resin curing systems which are highly advantageous when used with furan-based binders, but which are also useful with other resin systems as well.

Another object of the invention is to provide a resin system which is useful for making sand shapes which can be cured outside of patterns and molds, either in conventional ovens or in microwave ovens.

A still further object of the invention is to provide improved catalyst systems for curable or thermosetting resins of various kinds with such catalysts having highly desirable cure initiation and bench life characteristics.

A still further object of the invention is to provide a resin curing system wherein the energy required to initiate the curing reaction may derive from conventional ovens or other sources of sensible heat or some other sources such as micro-wave energy.

A still further object of the invention is to provide aliphatic or aromatic sulfonate catalysts which include metals such as copper, aluminum, iron and zinc and psuedo metals such as ammonium as the positive ion portion of the salt.

A still further object of the invention is to provide a resin system which performs well with certain binders within temperature ranges of 250°–300° F., with the same or other resins at about 350° F. and with these or still other resins of 400°–425° F., without sacrificing other desirable characteristics.

The foregoing and other objects and advantages of the invention are achieved in practice by providing a catalyst of the aliphatic or aromatic sulfonate type for use with acid cured resin systems such as furfuryl alcohol polymers, polymers of furfuraldehyde and phenol- and urea-formaldehyde resin systems modified with the addition of furfuryl alcohol or furfuraldehyde to provide improved resin binder systems having greatly increased bench life, very rapid cure times and high tensile strength.

The exact manner in which the foregoing objects and advantages of the invention are achieved in practice will become more clearly apparent when reference is made to the following detailed description of the various perferred embodiments of the invention set forth by way of example to illustrate the practice of the invention.

Normally, certain test methods may be used to predict accurately the effectiveness with which a resin system may be used in a foundry environment. These tests will generally indicate whether the material in question will act as an effective latent catalyst, what its performance characteristics in use will be, and how the resin system as a whole will perform. In this connection, the tests may be made to determine what bench life the mixed resin will have, with a long bench life being desirable, assuming the other characteristics of the system are satisfactory. The ultimate strength and uniformity of the final product are also important considerations, as is the time required for the resin to impart a set to the object formed in the sand mold.

One such method includes measuring the so-called dwell-time, which is the length of time the catalyzed resin-and-sand mixture remains in the heated pattern cavity before being removed therefrom for testing purposes. In making tests to determine the desirable characteristics of the present invention, dwell times of 10, 15, 20, 30, 45 and 60 seconds were used. The strength which the sand product possesses is determined by making a so-called "biscuit" or briquette of sand, that is, a formation of sand shaped in a characteristic way (a "dog bone" shape) and bonded by the resin being tested. After the so-called biscuit is formed, it is placed in a machine adapted to determine what the tensile and ultimate yield strengths of the part thus formed are. The shape of a typical briquette or biscuit is well known to those skilled in the art and accordingly, the characteristics thereof are not discussed further herein; for example, however, reference is made to such typical biscuit in a book entitled *Steel Foundry Practice*, by J. H. Hall, (Penton Publishing Co., Cleveland, Ohio 1950) where such unit is shown and described on page 8.

According to the present invention, as will be herein detailed, catalysts were first screened on a preliminary basis to determine whether they would provide desirable catalytic action. If a catalyst, in the presence of the resin, reacted immediately or within a short time, as determined by the generation of a sensible exotherm, such system was presumed to be incapable of demonstrating satisfactory bench life. Those catalysts which have the potential of a long bench life are determined by mixing them with a specimen of the binder intended to be used, and placing them in a test tube in an insulated atmosphere, such as that provided by a block having polystyrene or polyurethane foam insulation. The time in which a sensible exotherm developed is then determined. A desirable compound is one which does not demonstrate an exotherm, even while present in substantial amounts, such as 10% or more, for a period of about one hour at room temperature (20°–30° C.).

If upon being heated to a higher temperature, the catalyst initiates and maintains a high curing rate, it is considered to have potential for use in keeping with the invention. One typical catalyst of the invention, aluminum phenol sulfonate, when mixed with resin in such a test tube, displays no exotherm for up to eighty minutes or more at room temperature, but exotherms rapidly when the tube is placed in a test tube heater at 210° F.

A resin binder catalyzed with such aluminum phenol sulfonate catalyst having passed the preliminary screening test referred to above, was mixed with sand and tested as indicated in Table I below. A resin of the furfuryl alcoholformaldehyde type was prepared for use with a silica sand, for example, a Wedron 5025 silica sand. The resin binder was used in an amount equal to 1% of the net dry weight of the sand, and the catalyst was prepared in a 50% aqueous solution. After the catalyst and the sand were thoroughly mixed, the resin was added. The 50% catalyst solution was used in an amount equal to 40% by weight of the resin, and a biscuit was formed in a biscuit mold which was charged with the sand, binder, and catalyst. The mold was maintained at 300° F.

The first two sets of specimens were those made by filling the biscuit mold, first for a duration of 15 seconds and next, for a duration of 30 seconds. After these times, the biscuits were stripped from their respective molds, allowed to cool and were given tensile strength tests. The biscuits formed with the 15 second dwell-time showed a tensile strength of 55 psi, and the biscuits formed by remaining in the mold for 30 seconds developed a tensile stength of 265 psi.

These data are summarized in the first data line of Table I, set forth below. Next, two hours were permitted to elapse, and two more biscuits were made from the sand/resin/catalyst mix. As shown in the second data line of Table I, after a bench time of two hours, a biscuit made in a biscuit mold with a dwell-time of 15 seconds displayed a tensile strength of 93 psi, while a biscuit produced with a 30 second dwell-time in the mold displayed a tensile strength of 318 psi.

Data lines 3 through 7 inclusive of Table I below indicate that specimen biscuits were subsequently made after bench times of 4 hours, 5 hours, 6 hours, 23 hours and 48 hours respectively, and that the biscuits made therefrom at the indicated dwell-times possessed the tensile strengths shown in the right hand columns of Table I.

From the foregoing, it can be seen that even after 48 hours, the resin mixture was capable of being activated into a rapid cure within a very short time. Accordingly, the advantages of using aluminum phenol sulfonate as a latent catalyst for furan-based resin systems was demonstrated. The exact results of each test are summarized below.

EXAMPLE 1

TABLE I

| Bench Life v. Tensile Strength at Indicated Dwell Times (300° F.) | | |
|---|---|---|
| Bench Life | Tensile Strengths | |
| Times-Hours | 15 Sec. Dwell | 30 Sec. Dwell |
| T - 0 hrs. | 55 psi | 265 psi |
| 2 | 93 | 318 |
| 4 | 63 | 262 |
| 5 | 115 | 338 |
| 6 | 128 | 359 |
| 23 | 66 | 267 |
| 48 | 60 | 168 |

From the foregoing table, it will be seen that tensile strengths well above 200 psi were able to be obtained after 30 seconds of high temperature curing with a resin which has been added to sand containing the novel catalyst, in all cases where the bench life ranged from 0 up to 23 hours.

Even where a 48 hour bench life was used, the specimen biscuits displayed a tensile strength of 168 psi, which is satisfactory for many applications. With the extended bench lives indicated, it is therefore possible for the catalyst/resin/sand mix to be made in an amount which is anticipated will be used in one entire shift, and it will not be necessary to continually make new batches of treated sand during such working shift. Consequently, even where more sand has been mixed than will be used in a single shift, there will be no waste, provided the remainder can be used some time in the next shift or even the next two working shifts. Performance such as that indicated in Table I represents a significant improvement over prior art latent catalyst and clearly demonstrates the advantages of the invention.

After making the preliminary tests referred to above, additional tests were made to demonstrate the advantages of the invention.

In Table II, additional examples of the practice of the invention are set forth. In these examples, various different catalysts were used, including aluminum and copper salts of phenol and toluene sulfonic acids as well as the other catalysts identified therein. The same sort of tensile strength biscuits referred to above were manufactured by being heated in the molds at the dwell times indicated in the tables. The footnotes in Table II identify certain of the resin materials, the proportions in which they are mixed, and describes other details of the various formulations which are advantageously used in the practice of the invention. Unless otherwise indicated, catalyst percent is expressed by weight percent with respect to the resin; in actual practice, the catalyst is usually prepared and used in a 50% aqueous solution and consequently where 10% catalyst is indicated, 20% of a 50% by weight solution of the catalyst in water is used, and so on.

to be made in times ranging from as low as fifteen seconds to forty-five seconds, and in most cases, from about twenty seconds to about thirty seconds. Consequently, catalysts and catalyzed resin systems of the invention are advantageously able to perform at significantly lower temperatures than those necessary when using prior art catalysts and catalyzed resin systems.

TABLE II

Intermediate Temperature Binder Evaluation - 300° F. Cure Temperature

| Example Number | Binder Type | Binder/ Sand (Wt.) | Catalyst Type | Catalyst/ Resin (Wt.) | Tensile Strength @ Dwell Times in Seconds | | | | | | Bench Life |
|---|---|---|---|---|---|---|---|---|---|---|---|
| | | | | | 10 | 15 | 20 | 30 | 45 | 60 | |
| 2 | A[1] | 1% | Al(PSA)$_3$[2] | 10% | 0 | 30 | 43 | 214 | — | — | >24 hrs.[3] |
| 3 | " | " | Cu(PSA)$_3$[4] | 10% | 15 | 31 | 101 | 275 | — | — | >24 hrs. |
| 4 | " | " | Al(PSA)$_3$ | 20% | 9 | 53 | 153 | 323 | — | — | ~24 hrs. |
| 5 | " | " | Cu(PSA)$_3$ | " | 79 | 207 | 311 | 381 | — | — | ~24 hrs. |
| 6 | " | " | Al(PSA)$_3$ | " | — | — | 0 | 221 | 361 | — | ~24 hrs. |
| 7 | " | " | Cu(PSA)$_3$ | " | — | 110 | 184 | 347 | 307 | — | ~24 hrs. |
| 8 | " | " | Al(TSA)$_3$[5] | " | — | 25 | 60 | 223 | 318 | — | ~24 hrs. |
| 9 | " | " | Cu(TSA)$_3$[6] | " | — | 128 | 216 | 333 | 343 | — | >24 hrs. |
| 10 | " | " | Al(PSA)$_3$ | " | 0 | 0 | 283 | 361 | 330 | — | >6 hrs. |
| 11 | " | " | Al(MSA)$_3$[7] | " | — | — | — | 115 | — | — | ~16 hrs. |
| 12 | " | " | Al(MSA)$_3$ | 10% | — | — | 269 | — | — | — | ~20 hrs. |

Footnotes for TABLE II

[1]Binder "A" is a furfuryl alcohol-formaldehyde type acid cured resin binder. This material is commercially available from the Delta Oil Company of Milwaukee, Wisconsin, and is identified as "651-X".
[2]Aluminum phenol sulfonate.
[3]See text below for a detailed explanation of those examples wherein bench life is indicated as being "greater than" a particular time.
[4]Copper phenol sulfonate.
[5]Aluminum toluene sulfonate.
[6]Copper toluene sulfonate.
[7]Aluminum methane sulfonate.

In the above tables, bench life is sometimes indicated as being "greater than" a certain time. Where a definite or approximate bench time is given, it is implied that tests were performed to show that the material was capable of satisfactory using during the indicated period but that it was generally not satisfactory thereafter. In some cases, however, the test material was completely used before its effective bench life could be determined. In other cases, end-point tests were simply not performed, and accordingly, the figures show that the bench life was greater than that indicated, without implying that the bench life would necessarily end shortly after such period. In some cases, material having an indicated bench life of greater than five hours, for example, might have a bench life greater than twelve hours or even twenty-four hours, but test were not made with the above test materials to determine the maximum bench life.

From the examples set forth in Table II, it will be noted that even using a 300° F. cure, which is substantially lower than the temperature usually used in high volume core making, satisfactory sand shapes were able Consequently, the conditions of Table II may sometimes be referred to herein as "warm box", "moderate temperature", or "intermediate temperature" conditions.

After performing the tests referred to in Examples 2-12 above, additional sets of specimens were made as summarized in Table III, Examples 13-17. Of these examples, Example 13 typifies the prior art, while Examples 14-17 are additional examples of the practice of the invention. Table III shows catalysts of the inventions used with commercially available resin binders of a type different from those referred to in Table III; the composition of the Table III binders is referred to in the associated footnotes.

Table III also indicates that the catalysts of the invention are able to improve the performance of prior art resin binders by providing higher ultimate tensile strengths and rapid attainment of such tensile strengths, as well as unexpectedly providing an increase in bench life by a significant amount, in some cases, up to 250% or more.

TABLE III

Hot Box Binder Evaluation - 425°-450° F. Cure Temperature

| Example Number | Binder Type | Binder/ Sand (Wt.) | Catalyst Type | Catalyst/ Resin (Wt.) | Tensile Strength - Dwell Times in Seconds | | | | | | Bench Life |
|---|---|---|---|---|---|---|---|---|---|---|---|
| | | | | | 10 | 15 | 20 | 30 | 45 | 60 | |
| 13 | B[8] | 2% | NH$_4$Cl-based | 10% | 68 | — | 233 | 411 | 555 | — | 120 mins |
| 14 | C[9] | " | Al(PSA)$_3$ | " | 133 | — | 398 | 525 | 595 | — | 300 mins |
| 15 | A | 1% | ZnPSA[10] | 20%[11] | — | — | — | 281 | 309 | — | 24 hrs |
| 16 | A | " | NH$_4$PSA[12] | 20%[13] | — | — | — | — | 336 | — | 24 hrs |

TABLE III-continued

Hot Box Binder Evaluation - 425°–450° F. Cure Temperature

| Example Number | Binder Type | Binder/ Sand (Wt.) | Catalyst Type | Catalyst/ Resin (Wt.) | 10 | 15 | 20 | 30 | 45 | 60 | Bench Life |
|---|---|---|---|---|---|---|---|---|---|---|---|
| 17 | A | " | FePSA[14] | 20% | — | — | 350 | 318 | 292 | — | 24 hrs |

Tensile Strength - Dwell Times in Seconds

[8]This binder is a typical binder furan-based hot box binder used in commercial foundry practice and believed to comprise furfuryl alcohol, urea-formaldehyde and water, cured with an ammonium-chloride based catalyst.
[9]This binder is a phenolic type hot box binder, which is modified by the addition of furfuryl alcohol and is commercially available under the name Cordell 675, sold by Cordell Industries, Division of Niles Chemical Company of Mishawaka, Indiana.
[10]Zinc phenol sulfonate.
[11]20% total catalyst used; catalyst solution was 45.5% solution rather than 50% solution.
[12]Ammonium phenol sulfonate.
[13]20% total catalyst used, catalyst solution was 37% solution rather than 50% solution.
[14]Ferric phenol sulfonate.

EXAMPLE 18-OVEN-CURED BINDER

Catalyst systems of the present invention are also useful in curing resins employed in making so-called "green shapes" or sand shapes which are self-sustaining when removed from a pattern or the like or which are formed so as to be free standing rather than being formed within a pattern or mold. To illustrate the practice of this form of invention, a sand shape was made in the form of tensile strength test biscuit referred to above. The sand was a Wedron silica sand having mixed therewith 1% by weight of binder "A" referred to above (f.n. 1, Table II) having 20 % by weight of aluminum phenol sulfonate catalysts therein. After the green shape was formed, it was placed in a conventional oven at a low temperature, i.e., 250° F., for the times indicated below. The tensile strength of the resulting biscuit is shown in the right hand column below, opposite the curing time. Because the shapes were cured in a conventional oven rather than being formed in a heated mold, relatively long times were required; it will be noted that the times are expressed in minutes rather than seconds, as follows:

| Time in Oven | Tensile Strength |
|---|---|
| 7 min. | 225 psi |
| 14 min. | 355 psi |
| 20 min. | 315 psi |
| 26 min. | 380 psi |
| 40 min. | 365 psi |

EXAMPLE 19

Furan-Based Binder Cured in Microwave Oven

A tensile test biscuit of the type referred to herein was made in free standing form by mixing sand with 1% of the binder referred to in footnote 1 to Table II. The binder was catalyzed with 15% aluminum phenol sulfonate, and the resulting shape was cured in a Cober 6 KW size microwave oven for two minutes at a power setting of 4 KW. The resulting test biscuit showed a tensile strength of 455 psi one hour after completion of the two minute cure. This catalyzed composition displayed a bench life of about eighteen hours.

EXAMPLE 20

Furan-Based Binder Cured In Microwave Oven

A biscuit similar to that referred to in Example 19 was made, except that 1.5% binder was used and 12.5% catalysts was employed. The test biscuit displayed a tensile strength of 680 psi one hour after receiving a two minute cure as in Example 19. This catalyzed composition displayed a bench life of about twenty-four hours.

EXAMPLE 21

Furan-Based Binder Cured in Microwave Oven

A tensile strength biscuit such as that referred to herein was made using 1% of a binder of the type referred to in footnote 1 to Table II, catalyzed by 12.5% (based on binder) of aluminum phenol sulfonate and cured for two minutes at a 4 KW power setting in a microwave oven as above. The test biscuit showed a tensile strength of 370 psi, and the sand/resin/catalyst system displayed a bench life of about fifteen hours.

EXAMPLE 22

Microwave Oven Curable Phenolic Binder

A tensile strength biscuit such as that referred to herein was made using a commercially available phenolic hot box binder such as "Fas Set 70" from the Thiem Corporation of Oak Creek, Wis. 1% by weight of this binder was mixed with a catalyzed sand. The catalyst, aluminum phenol sulfonate, was present in an amount equal to 12.5% by weight of the resin. The resulting composition had a bench life of about eight hours and the test biscuit showed a tensile strength of 340 psi.

EXAMPLE 23

Microwave Oven Curable Phenolic Binder

A tensile strength biscuit such as that referred to herein was made using a commercially available phenolic hot box binder such as Cordell 815, applied by Cordell Industries of Mishawaka, Ind. 1% by weight of this binder was mixed with a catalyzed sand. The catalyst, aluminum phenol sulfonate, was present in an amount equal to 12.5% by weight of the resin. The resulting composition had a bench life of about twelve hours and the test biscuit showed a tensile strength of 220 psi.

All of the above examples illustrate generally the various form in which the invention may be practiced.

Referring now more specifically to the individual examples, Examples 2 and 3 show that, using ten percent catalyst with respect to resin, both aluminum and copper salts of phenosulphonic acid were able to band core sand into a biscuit having well over 200 psi tensile strength after a dwell time within a 300° mold of only thirty seconds; these compositions still provided a bench life of twenty-four hours or more.

When the amount of catalyst was increased to 20% (based on resin) as illustrated in Exmaples 4 and 5, both the aluminum and copper salts of phenosulphonic acid provided biscuits with tensile strengths of over 300 psi at a thirty second dwell time while providing bench lives of over twenty-four hours.

Examples 6 and 7 show similar results, but refer to materials which were tested after slightly longer dwell times, and which ultimately achieved tensile strengths of over 300 psi. Referring specifically to Examples 8 and 9, toluene sulfonic acid salts rather than phenol sulfonic acid salts were used, but the tensile strength properties and the dwell times, however, were roughly analogous to those achieved by counterpart phenol sulfonates.

Referring now to Example 10, a slightly slower-curing composition is shown. It uses aluminum phenol sulfonate as a catalyst, and achieves a tensile strength of 361 psi after forty-five second dwell time, while still displaying a bench life of twenty-four hours.

Referring now specifically to Examples 11 and 12, it is shown that, while not the preferred catalyst system, aluminum methane sulfonate is also operative to cure resin binders of the furan-based type. Example 13 is an example of the prior art, and shows that where good hot box binder characteristics are able to be achieved, the bench life is only about two hours. Furthermore, catalyst systems of the type illustrated in Example 13 are not effective at temperatures below 400° F., and consequently, they lack the ability to be used in those applications in which binders of the invention may be used, namely, those wherein cure is initiated at temperatures as low as 250° F.

Referring now generally to Examples 14–17, it will be noted that, at the 425°–450° F. temperatures indicated, the catalysts are capable of curing resins so as to provide test biscuits having tensile strengths of 200 to 300 psi or more in forty-five seconds or less, even where (in Examples 15–17) the binder is used in quantities of 1% with respect to the sand. At the same time, these resin/catalyst systems provide a bench life of twenty-four hours or more.

As pointed out above, the catalysts of Examples 15 and 16 are not as soluble in water as the aluminum and copper salts referred to above. However, the iron salt is sufficiently soluble to make a 50% aqueous solution at 72° F., while the zinc and ammonium salts require moderate heating in order to achieve solubilities of 45.5% and 37% respectively. Zinc, ammonium and aluminum phenol sulfonates are commercially available, and can be obtained, for example, from Salisbury Laboratories of Charles City, Iowa. Previously, these chemicals have been used in other applications such as underarm deoderants, agricultural chemicals and as intermediates in the pharmaceutical industry. The ferric phenol sulfonate can be prepared by known methods as may aluminum and copper phenol and toluene sulfonates.

The above Examples 18–23 illustrate the use of the sulfonic acid salts of the invention as catalysts for various curable binder systems, without purporting to be an exhaustive list of all combinations and proportions thereof; more particularly, the tests of these examples were performed merely to demonstrate that the catalyst systems of the invention are useful not only with furan-based binders and furan-containing binders, but also with other curable binder systems such as phenolic hot box binders. The examples, likewise, illustrate that the resins may be cured in their patterns, or outside the patterns, and in the latter case, either by conventional ovens or in microwave ovens.

While specific examples are not set forth herein relating to the performance of all possible sulfonic acid salts, many such salts are also suitable for use as catalysts in keeping with the present invention. In addition to the aromatic salts disclosed above, for example, salts of other aromatic sulfonic acids may be used, such as the salts of benzene and xylene sulonic acids, etc.; while methane sulfonic acid salts were specifically illustrated in the examples, other lower alkyl salts are operative as well, and these include salts having a $C_1$–$C_8$ grouping as the lower alkyl substituent.

These salts are preferably made by the reaction of the acids referred to herein with weak base such as aluminum, copper, zinc, ammonium and ferric iron hydroxides, the positively changed ion portions of which are sometimes collectively referred to herein as "metal or psuedo metal ims".

From the foregoing data, it will be appreciated that novel catalysts and catalyzed resin systems may be made according to the invention so as to provide binder systems having greatly increased bench life, economy in operation, and rapid cure at hot box temperatures, i.e., 425°–450° F., for example.

Selected sulfonates also provide the extended bench life characteristic of the invention and provide the further advantages of being activatable at lower temperatures. Such resin systems may be thought of as making possible a moderate or intermediate temperature ("warm box") cure. The core materials made with the catalyzed resin binder systems of the invention display excellent strength characteristics and are free from functional drawbacks in use.

It will thus be seen that the present invention provides a novel catalyst and catalyzed resin system compositions for foundry and other applications, such compositions having a number of advantages and characteristics including those pointed out above and others which are inherent in the invention. Preferred embodiments of the invention have been described by way of illustration, it is anticipated that changes and modifications of the described catalysts and catalyzed resin system compositions will occur to those skilled in the art and that such changes and modifications may be made without departing from the spirit of the invention or the scope of the appended claims.

I claim:

1. A method of preparing a core and sand material adapted for the rapid manufacture of resin bound sand shapes, said method including treating a core sand material with a catalyst material to form a treated core sand material, and thoroughly mixing said treated core sand material with from about 0.5% to about 5%, based on the weight of said sand, of a curable resin binder material to provide a curable core sand material capable of being cured in a core-making pattern less than one minute at a temperature of at least 250° F., said catalyst material comprising at least one salt made from a weak base and an acid from the group comprising lower aliphatic and aromatic sulfonic acids, said catalyst material being present in an amount by weight of from about 5% to about 40% of the weight of said resin binder material.

2. A method as defined in claim 1 wherein said resin binder material includes at least about 20% of a furan-based acid-curable resin material.

3. A method as defined in claim 1 wherein said resin binder material comprises by weight, from about 1% to about 2% of the weight of said core sand material.

4. A method as defined in claim 1 wherein said catalyst material is present by weight, in an amount of from about 10% to about 25% of the amount of said resin binder material.

5. A method as defined in claim 1 wherein said catalyst comprises a copper or aluminum salt of benzene or toluene sulfonic acid and mixtures of said salts, said core sand material being curable in a heated mold in said one minute or less time from about 300° F. to about 450° F.

6. A method as defined in claim 1 wherein said catalyst material comprises an aluminum, copper, zinc, ferric or ammonium salt of a benzene-, toluene-, phenol-, methane-, or xylene sulfonic acid, and mixtures of said salts.

7. A treated core sand material capable of being formed into a predetermined shape and bound by a curable resin so as to retain sand shape for use in metal founding, said treated sand material having a bench life of at least six hours and being curable in less than one minute at a temperature of at least 250° F. in a mold heated to said temperature, said treated material including from about 95% to about 99.5% by weight of core sand, from about 0.5% to about 5% by weight of an acid curing type resin binder, said treated sand material further including a catalyst material present in an amount of from about 5% to about 40% of the weight of said resin, said catalyst material comprising at least one salt which is the reaction product of a weak base and an aromatic or lower aliphatic sulfonic acid.

8. A treated core sand material as defined in claim 7 wherein said resin binder comprises from about 0.75% up to about 2.0% by weight of the weight of said sand.

9. A treated core sand material as defined in claim 7 wherein said resin binder comprises at least 25% of a polymer based on furfuryl alcohol.

10. A treated core sand material as defined in claim 7 wherein said catalyst material comprises at least one salt from the group which includes aluminum, copper, zinc, ferric, and ammonium salts of benzene-, phenol-, toluene-, xylene or lower alkyl sulfonic acids, and mixtures of said salts.

11. A treated core sand material as defined in claim 7 wherein said catalyst comprises a copper or aluminum salt of benzene or toluene sulfonic acid and mixtures of said salts.

12. A treated core sand material as defined in claim 7 wherein said catalyst is present in an amount, by weight, of from about 10% to about 25% of the weight of said resin.

13. A method of preparing a sand shape useful in metal founding, said method comprising treating a mass of core sand material with a catalyst material comprising the reaction product of a weak base and an acid selected from the group which includes benzene-, phenol-, toluene-, xylene- and lower alkyl sulfonic salts to form a treated sand material, adding, by weight, from about 0.5% to about 5%, based on the weight of said sand, of an acid curable resin binder material to form a resin treated sand material, forming a sand shape from said resin treated sand material, and imparting a self-sustaining shape to said treated sand material by applying heat energy to said shape for a time sufficient to cure said resin, said catalyst being present in an amount of from about 5% to about 40%, by weight, of the amount of said resin binder.

14. A method as defined in claim 13 wherein applying said heat energy comprises forming said sand shape within a mold which has been heated to at least about 250° F., and permitting said resin to cure for no longer than about two minutes within said mold.

15. A method as defined in claim 13 wherein applying said heat energy comprises placing said self-sustaining sand shape in a conventional oven and curing said resin by maintaining the temperature in said oven at about at least 250° F. for at least five minutes.

16. A method as defined in claim 13 wherein applying said heat energy comprises placing said self-sustaining sand shape in a microwave oven and curing said resin by maintaining said oven in an energized condition for at least one minute.

17. A method of controlling the curing properties of a curable resin composition used in the manufacture of sand shapes, said method including adding to the sand used to form said sand shapes at least one composition from the group of compositions which includes benzene-, phenol-, toluene-, xylene-, and lower alphitalic sulfonic acid salts of weak bases to form a treated sand product, mixing with said treated sand product a curable resin adapted for use in forming foundry sand shapes, and thereafter exposing said sand shape to heat energy for a time sufficient to cause curing of said resin binder.

* * * * *

UNITED STATES PATENT AND TRADEMARK OFFICE
CERTIFICATE OF CORRECTION

PATENT NO. : 4,317,763
DATED : March 2, 1982
INVENTOR(S) : James E. Menting

It is certified that error appears in the above—identified patent and that said Letters Patent is hereby corrected as shown below:

Column 5, line 43, after the word alcohol, please insert a dash;

Column 6, line 15, delete the word "was" and in place thereof, insert -- were --;

line 52, delete the word "catalyst" and in place thereof, insert -- catalysts --;

Column 8, line 47, delete the words "Table III," and in place thereof, insert -- Table II --;

Column 9, line 67, delete the word "catalysts" and in place thereof, insert -- catalyst --;

Column 12, line 5, delete the word "sulonic" and in place thereof, insert the word -- sulfonic --;

line 13, delete the word "changed" and in place thereof, insert -- charged --;

line 46, delete the word "and".

Signed and Sealed this

Twenth-eighth Day of September 1982

[SEAL]

Attest:

GERALD J. MOSSINGHOFF

Attesting Officer  Commissioner of Patents and Trademarks